US012463887B1

(12) United States Patent
Parra et al.

(10) Patent No.: US 12,463,887 B1
(45) Date of Patent: Nov. 4, 2025

(54) SYSTEMS AND METHODS FOR PROVIDING CLOUD INTEGRATION RECOMMENDATIONS BASED ON REAL-TIME TRAFFIC MONITORING

(71) Applicant: Zscaler, Inc., San Jose, CA (US)

(72) Inventors: Eduardo Manuel Parra, Redmond, WA (US); Amit Raikar, Seattle, WA (US); Paul Dana Abbott, Seattle, WA (US)

(73) Assignee: Zscaler, Inc., San Jose, CA (US)

( * ) Notice: Subject to any disclaimer, the term of this patent is extended or adjusted under 35 U.S.C. 154(b) by 69 days.

(21) Appl. No.: 18/651,876

(22) Filed: May 1, 2024

(51) Int. Cl.
*G06F 15/16* (2006.01)
*H04L 41/22* (2022.01)
*H04L 43/0876* (2022.01)

(52) U.S. Cl.
CPC .......... *H04L 43/0876* (2013.01); *H04L 41/22* (2013.01)

(58) Field of Classification Search
CPC ........................... H04L 41/22; H04L 43/0876
USPC ....................................................... 709/224
See application file for complete search history.

(56) References Cited

U.S. PATENT DOCUMENTS

| 7,228,564 B2 | 6/2007 | Raikar et al. |
| 7,636,944 B2 | 12/2009 | Raikar |
| 7,712,133 B2 | 5/2010 | Raikar et al. |
| 7,822,982 B2 | 10/2010 | Raikar |
| 7,849,320 B2 | 12/2010 | Raikar et al. |
| 7,890,999 B2 | 2/2011 | Ramarao et al. |
| 8,065,368 B2 | 11/2011 | Raikar et al. |
| 8,296,847 B2 | 10/2012 | Mendonca et al. |
| 8,577,044 B2 | 11/2013 | Raikar |
| 10,275,451 B2 * | 4/2019 | Bhowmick .......... G06F 16/9535 |
| 11,276,004 B2 * | 3/2022 | Chen ...................... G06N 20/00 |
| 11,308,540 B2 * | 4/2022 | Bhowmick .......... G06F 16/9535 |
| 12,002,082 B2 * | 6/2024 | Rizk ................... G06Q 30/0631 |
| 12,292,991 B2 * | 5/2025 | Kulkarni ............. G06F 16/1827 |
| 12,299,495 B2 * | 5/2025 | Ramasamy ......... G06F 11/3442 |
| 2004/0199647 A1 | 10/2004 | Ramarao et al. |
| 2005/0111668 A1 | 5/2005 | Raikar |
| 2006/0248082 A1 | 11/2006 | Raikar et al. |
| 2007/0097998 A1 | 5/2007 | Raikar |
| 2014/0052542 A1 * | 2/2014 | Zhang ................ G06Q 30/0269 705/14.66 |
| 2015/0242470 A1 * | 8/2015 | Ben-Itzhak ............ G06Q 30/02 707/722 |
| 2018/0075356 A1 * | 3/2018 | Chen ...................... G06N 20/00 |
| 2019/0019217 A1 * | 1/2019 | Bhowmick ............ G06Q 30/02 |
| 2020/0036574 A1 | 1/2020 | Parra et al. |
| 2022/0413929 A1 * | 12/2022 | Ramasamy ......... G06F 11/3006 |

(Continued)

FOREIGN PATENT DOCUMENTS

DE          10346927 A1    8/2004

*Primary Examiner* — Moustafa M Meky
(74) *Attorney, Agent, or Firm* — Baratta Law PLLC; Lawrence A. Baratta, Jr.

(57) ABSTRACT

Systems and methods for providing cloud integration usage recommendations based on real-time traffic monitoring include monitoring traffic traversing a cloud-based system, the traffic originating from one or more endpoints associated with a customer of the cloud-based system; extracting metadata from the monitored traffic; determining one or more software usage recommendations based on the extracted metadata; and presenting the one or more software integration usage recommendations via a portal accessible by one or more users.

20 Claims, 8 Drawing Sheets

(56) References Cited

U.S. PATENT DOCUMENTS

| | | | |
|---|---|---|---|
| 2023/0080396 A1* | 3/2023 | Rizk | G06Q 30/0631 |
| | | | 705/26.7 |
| 2024/0212706 A1* | 6/2024 | Feng | G11B 27/34 |
| 2024/0303358 A1* | 9/2024 | Kulkarni | G06F 21/6218 |
| 2025/0028516 A1* | 1/2025 | Parandehgheibi | G06F 8/65 |
| 2025/0181737 A1* | 6/2025 | Anjan | G06F 21/62 |

* cited by examiner

SYSTEMS AND METHODS FOR PROVIDING CLOUD INTEGRATION RECOMMENDATIONS BASED ON REAL-TIME TRAFFIC MONITORING

FIELD OF THE DISCLOSURE

The present disclosure generally relates to computer networking systems and methods. More particularly, the present disclosure relates to systems and methods for providing cloud integration recommendations based on real-time traffic monitoring.

BACKGROUND OF THE DISCLOSURE

Information Technology (IT) administrators associated with enterprises continuously search for pathways to optimize and further secure their environment. When faced with hundreds, and in some cases thousands, of options for streamlining and securing their environment, it can prove to be extremely difficult to determine which options are right for their specific needs. Traditionally, IT personnel spend excessive amounts of man hours searching for integrations, products, etc. that suit their users' requirements. This can prove to be tremendously inefficient due to the sheer number of available options. Additionally, there is no way of knowing which of the available options best suits the needs of an environment's users. The present disclosure provides systems and methods for providing tailored software integration usage recommendations based on real-time traffic monitoring.

BRIEF SUMMARY OF THE DISCLOSURE

The present disclosure relates to systems and methods for providing cloud integration recommendations based on real-time traffic monitoring. In an embodiment, the present disclosure includes a method with steps, a cloud-based system configured to implement the steps, and a non-transitory computer-readable medium storing computer-executable instructions for causing performance of the steps. The steps include monitoring traffic traversing a cloud-based system, the traffic originating from one or more users associated with a customer of the cloud-based system; extracting metadata from the monitored traffic; determining one or more software recommendations based on the extracted metadata; and presenting the one or more software recommendations via a portal accessible by one or more users.

The steps can further include monitoring real-time user traffic via the cloud-based system, and wherein the traffic is monitored between one or more users and one or more destinations. The metadata can include any of destination Internet Protocol (IP) address, Fully Qualified Domain Name (FQDN), Domain Name System (DNS) records, Uniform Resource Locator (URL), Server Name Indication (SNI), Internet Protocol Security (IPsec), Internet Key Exchange (IKE) vendor name, and data plane markings. The steps can further include receiving additional information associated with the traffic from a connector application executing on one or more computing devices associated with the one or more endpoints. The additional information can include any of agents installed on the one or more computing devices and applications installed on the one or more computing devices. The customer of the cloud-based system can be one of a plurality of customers, wherein the extracting, determining, and presenting are performed on a per-customer basis. The one or more software recommendations can include integration recommendations, wherein the determining further includes cross-referencing the extracted metadata with destinations associated with third party products from service providers which have integrations with the cloud-based system. The steps can further include receiving feedback associated with the one or more software recommendations; and altering the one or more software recommendations based thereon. The altering can include any of removing a software recommendation of the one or more software recommendations and reducing a confidence of a software recommendation of the one or more software recommendations. The presenting can further include providing any of deployment guides, customer enablement collateral, and demonstrations associated with each of the one or more software recommendations.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a computing device, which may be used with the cloud-based system or the like.

DETAILED DESCRIPTION OF THE DISCLOSURE

Again, the present disclosure relates to systems and methods for providing cloud integration recommendations based on real-time traffic monitoring. The present disclosure includes monitoring customer traffic in real-time to identify the usage of products and services. That is, the cloud-based system 100 is adapted to monitor user traffic to determine what services and products customers of the cloud-based system 100 are using I order to provide verified integration recommendations. The various integration recommendations can be provided to users via an administrative portal including an application marketplace for selecting integrations to enable.

Example Cloud-Based System Architecture

Figure 1A:
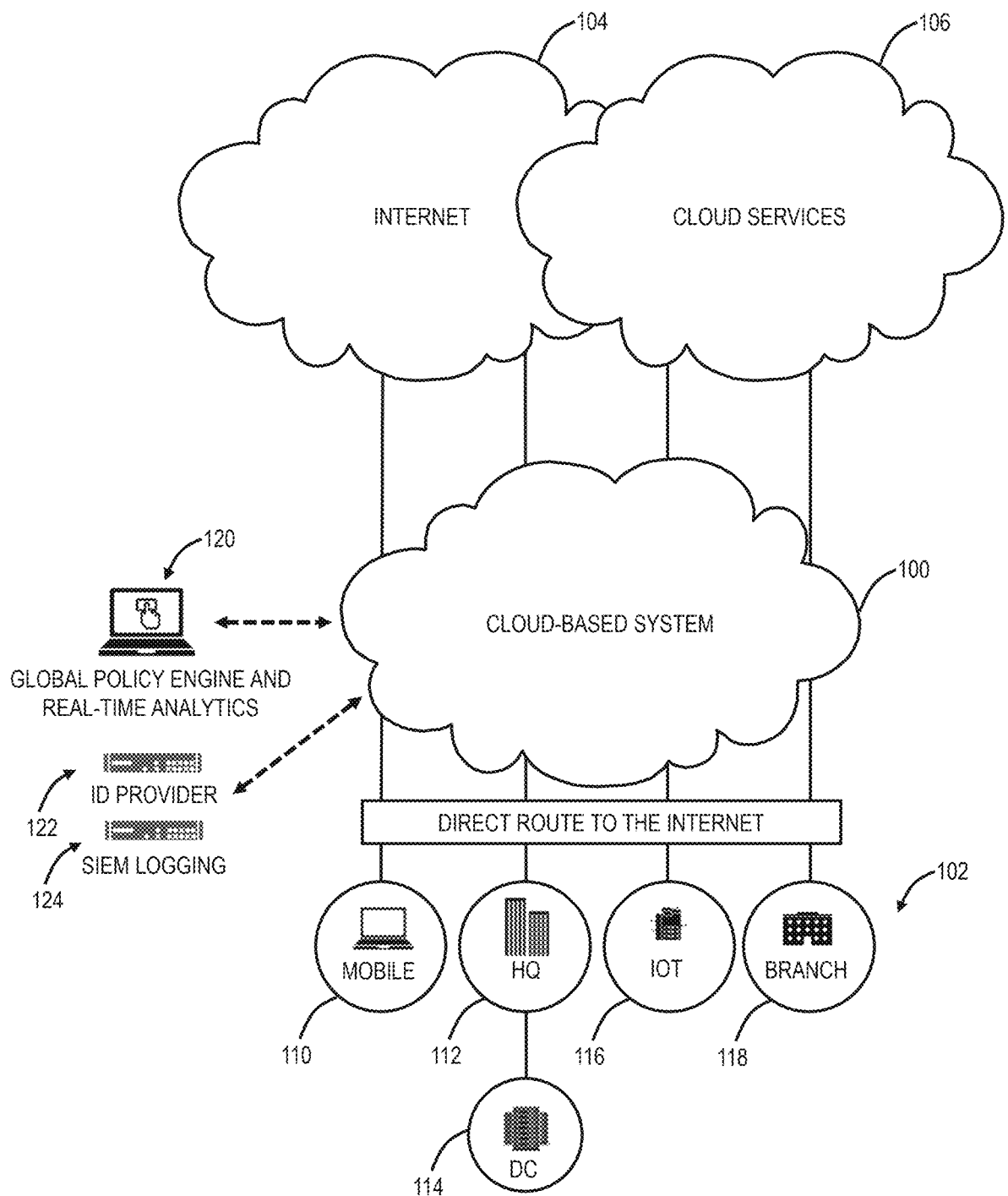
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various end points 102, as well as other cloud services. In this manner, the cloud-based system 100 is located between the endpoints 102 and the Internet as well as any cloud services 106 (or applications) accessed by the endpoints 102. As such, the cloud-based system 100 provides inline monitoring inspecting traffic between the endpoints 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc. It will be appreciated that the term endpoint can refer to any of a user utilizing a user device, an IoT device, workload, etc. and the terms endpoint and user can be used interchangeably herein.

The cloud-based firewall can provide Deep Packet Inspection (DPI) and access controls across various ports and protocols as well as being application and end point aware. The URL filtering can block, allow, or limit website access based on policy for a endpoint, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the endpoints 102. As such, newly discovered threats can be promulgated throughout the cloud-based system 100 for all tenants practically instantaneously. The antivirus protection can include antivirus, antispyware, antimalware, etc. protection for the endpoints 102, using signatures sourced and constantly updated. The DNS security can identify and route command-and-control connections to threat detection engines for full content inspection.

The DLP can use standard and/or custom dictionaries to continuously monitor the endpoints 102, including compressed and/or SSL-encrypted traffic. Again, being in a cloud implementation, the cloud-based system 100 can scale this monitoring with near-zero latency on the endpoints 102. The cloud application security can include CASB functionality to discover and control endpoint access to known and unknown cloud services 106. The file type controls enable true file type control by the endpoint, location, destination, etc. to determine which files are allowed or not.

Figure 5:
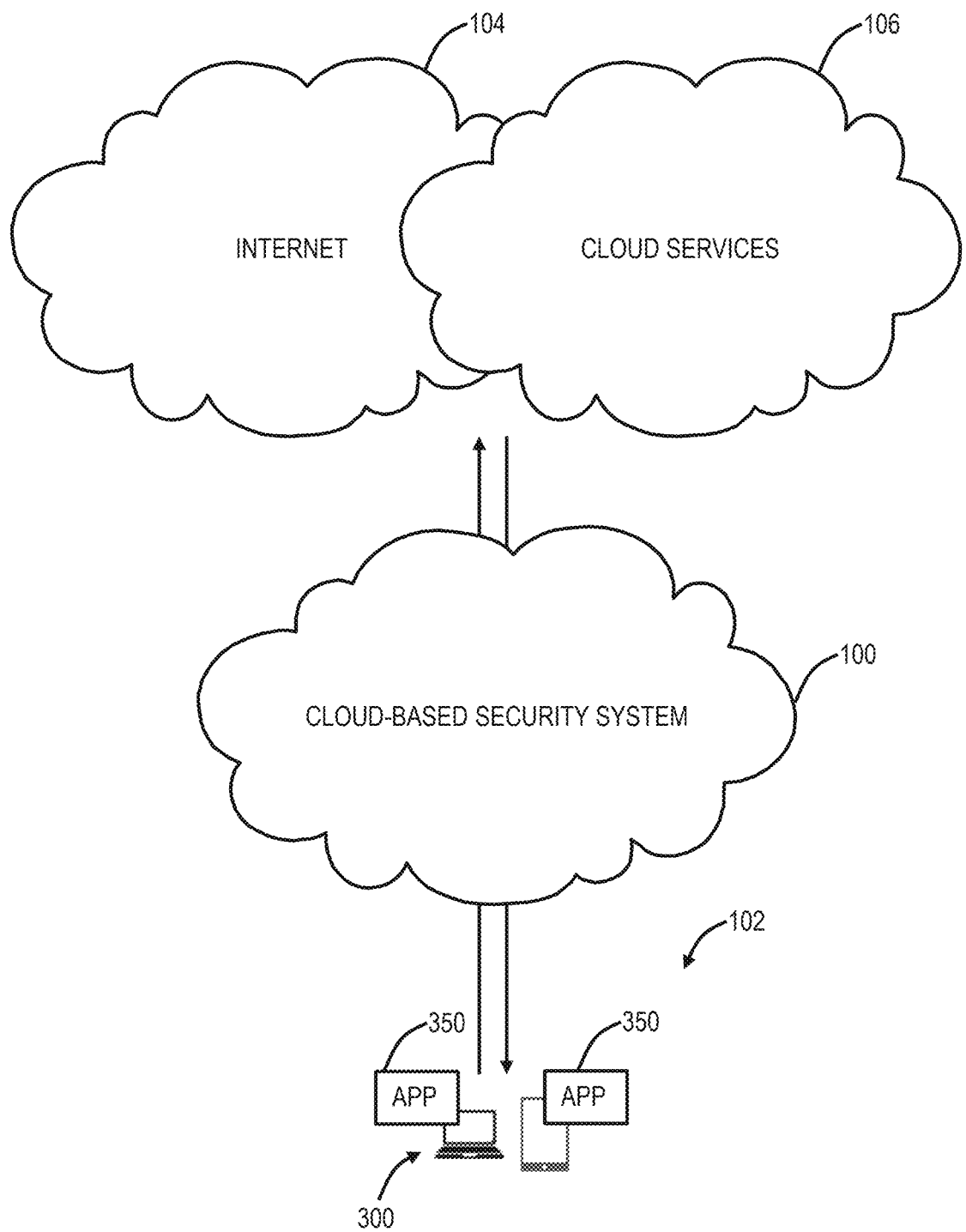
FIG. 5 is a network diagram of the cloud-based system illustrating an application on computing devices configured to operate through the cloud-based system.

For illustration purposes, the endpoints 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more computing devices (an example computing device 300 is illustrated in FIG. 5). The devices 110, 116, and the locations 112, 114, 118 are shown for illustrative purposes, and those skilled in the art will recognize there are various access scenarios and other endpoints 102 for the cloud-based system 100, all of which are contemplated herein. The endpoints 102 can be associated with a tenant, which may include an enterprise, a corporation, an organization, etc. That is, a tenant is a group of users/endpoints who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize an endpoint 102 which is a user has to use a corresponding computing device 300 for accessing the cloud-based system 100 and the like, and the description herein may use the endpoint 102 and/or the computing device 300 interchangeably.

Further, the cloud-based system 100 can be multi-tenant, with each tenant having its own endpoints 102 and configuration, policy, rules, etc. One advantage of the multi-tenancy and a large volume of endpoints is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between endpoints (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the endpoints 102, as well as independent of platform, operating system, network access technique, network access provider, etc.

There are various techniques to forward traffic between the endpoints 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the endpoints 102 and the Internet 104 or the cloud services 106 is via the cloud-based system 100. As such, the cloud-based system 100 has visibility to enable various functions, all of which are performed off the computing device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the endpoints 102 and to a Security Information and Event Management (SIEM) system 124 for event logging. The system 124 can provide alert and activity logs on a per-endpoint 102 basis.

Zero Trust

Figure 1B:
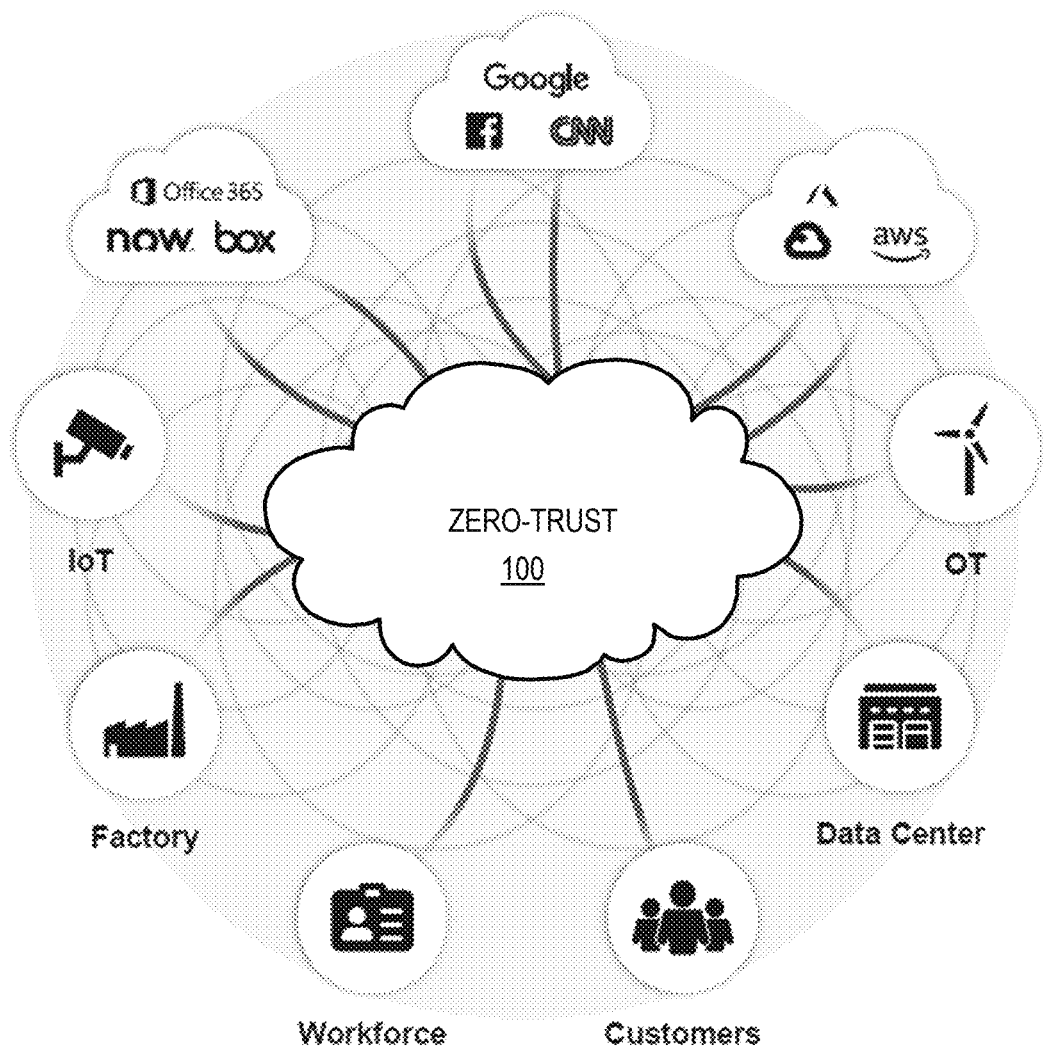
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., endpoint identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's endpoints and traffic, including that which is encrypted; monitoring and verification of traffic between parts of the environment; and strong multifactor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time-before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
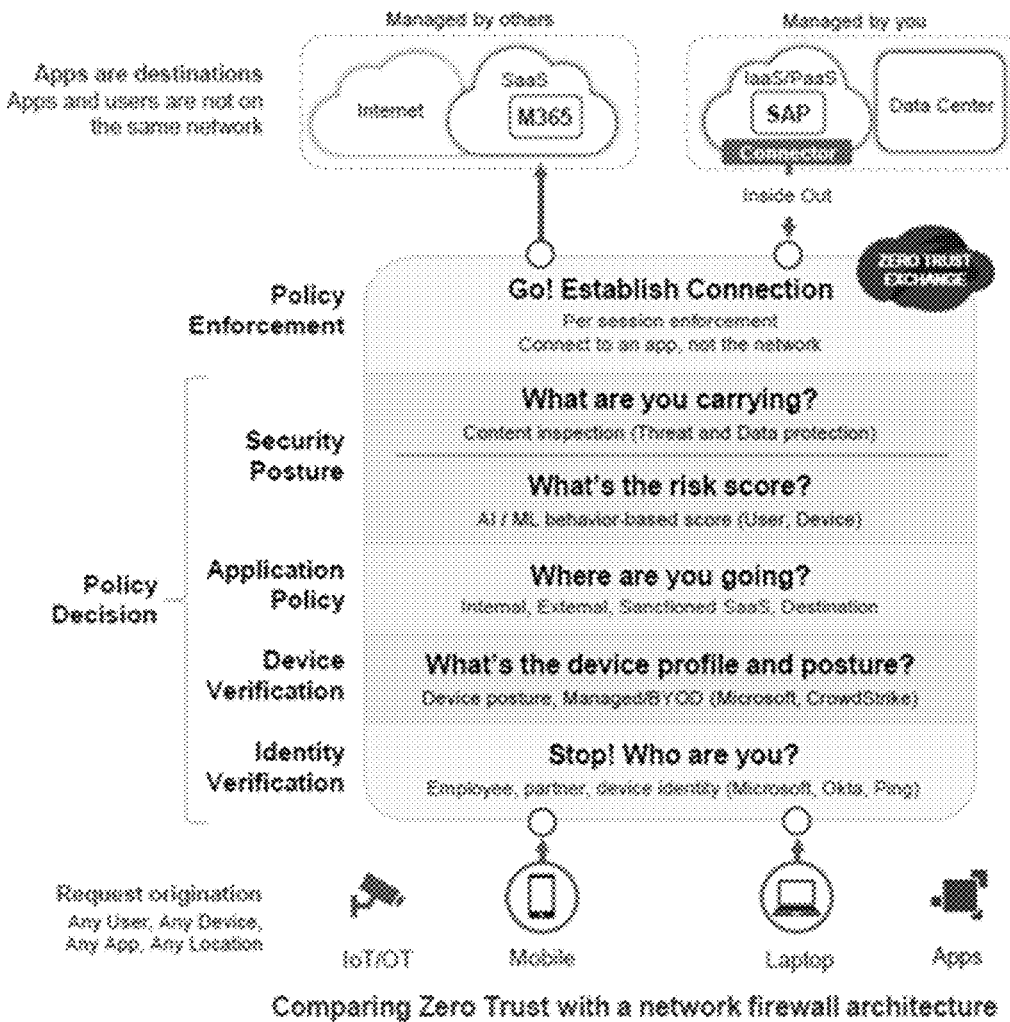
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the endpoint 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Those skilled in the art will appreciate the cloud-based system 100 can offer any variant of cloud services, including security services such as a Secure Web Gateway (SWG), Secure Service Edge (SSE), or the like. That is, any security function that typically is implemented via an application, edge device, router, gateway, etc. can be provided via a service through the cloud-based system 100.

Example Implementation of the Cloud-Based System

Figure 2:
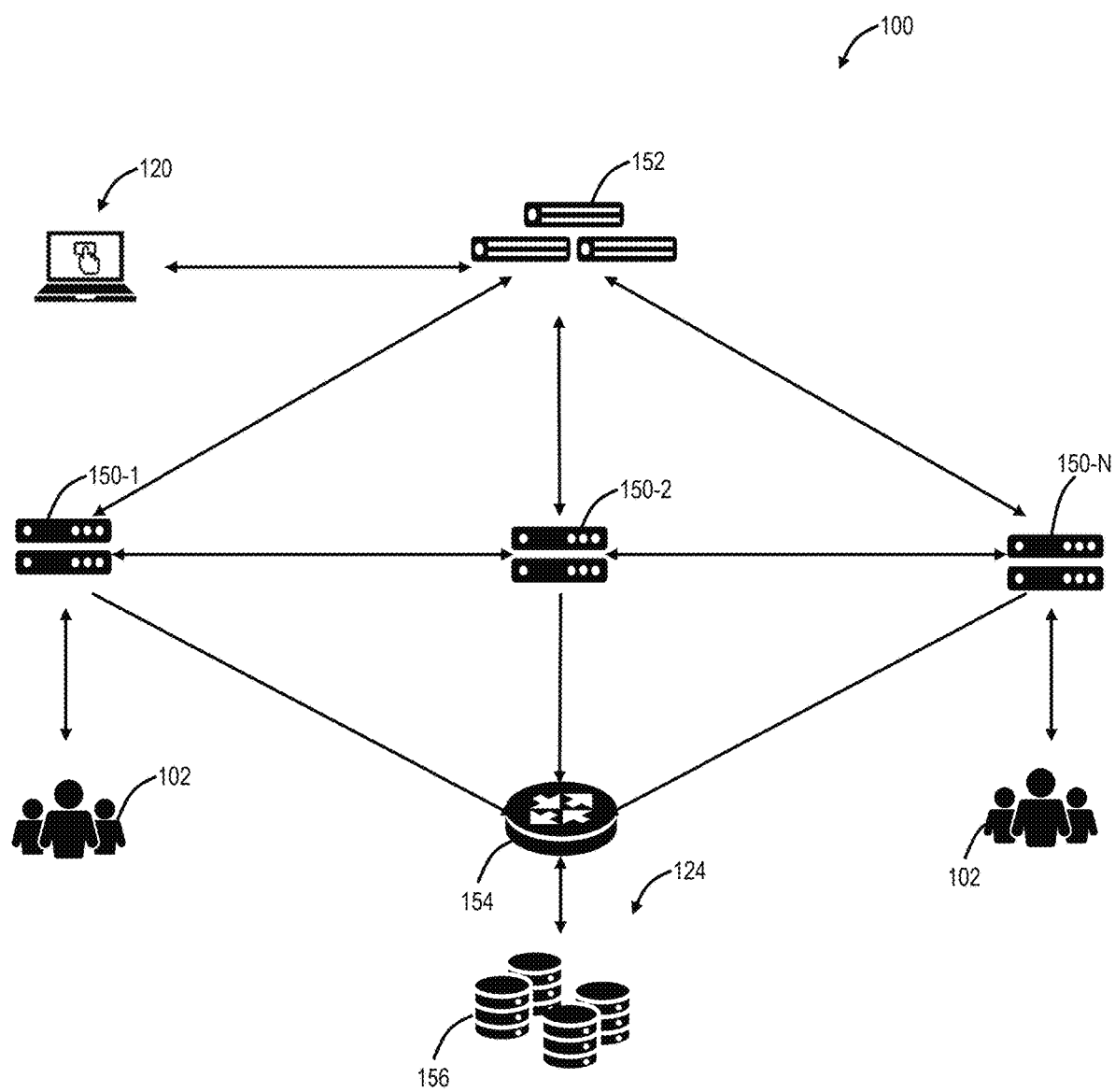
FIG. 2 is a network diagram of an example implementation of the cloud-based system.
Figure 4:
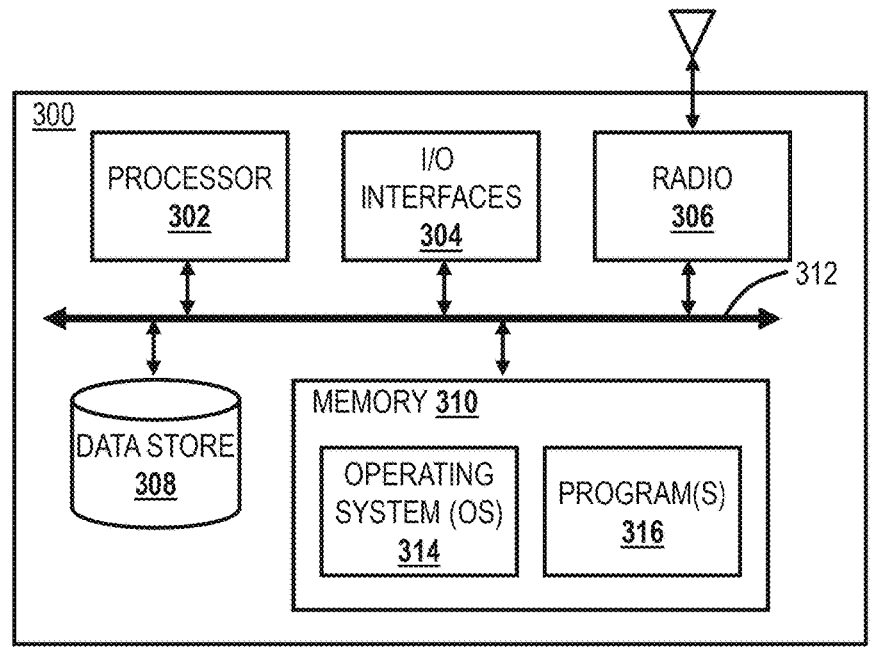

FIG. 2 is a network diagram of an example implementation of the cloud-based system 100. In an embodiment, the cloud-based system 100 includes a plurality of nodes 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the endpoints 102 and are configured to execute policy, based on the central authority 152, for each endpoint 102. The nodes 150 can be geographically distributed, and the policy for each endpoint 102 follows that endpoint 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the endpoints 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that endpoint 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the endpoint 102 next makes a request. In an embodiment, the node 150 exchanges "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), Zscaler Posture Control (ZPC), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). ZPC is a Cloud-Native Application Protection Platform (CNAPP) which is a new category of security products, encompassing the functionality previously found in Cloud Security Posture Management (CSPM) and Cloud Workload Protection Platform (CWPP) products and more. Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
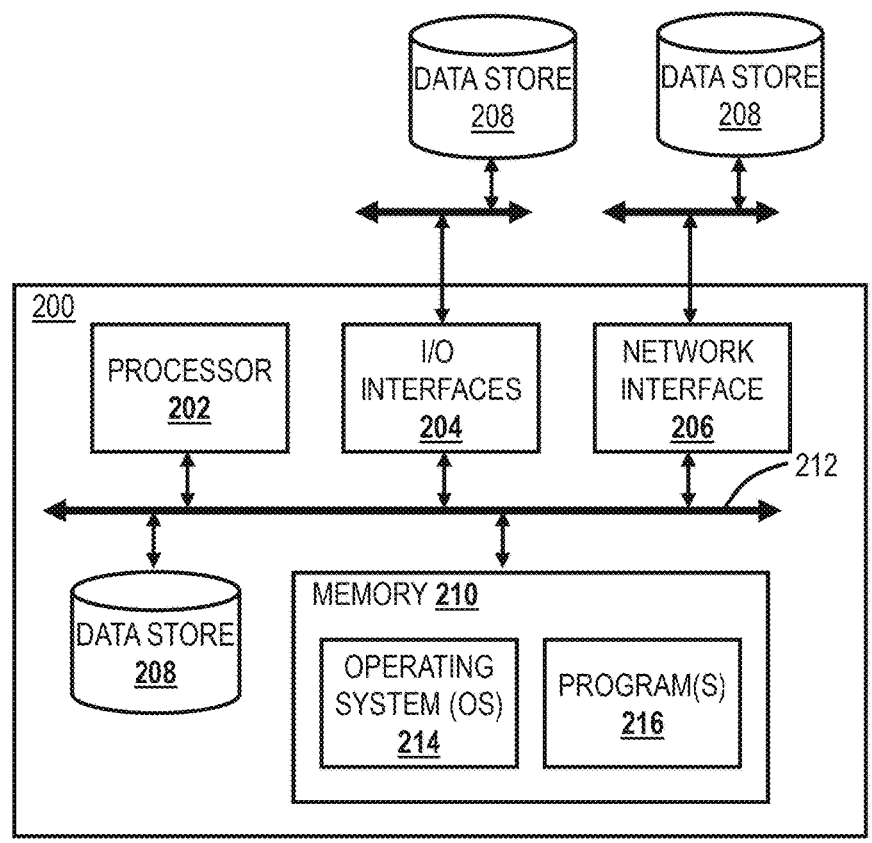
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example Computing Device Architecture

FIG. 4 is a block diagram of a computing device 300, which may be used with the cloud-based system 100 or the like. Specifically, the computing device 300 can form a device used by a user, and this may include common devices such as laptops, smartphones, tablets, netbooks, personal digital assistants, MP3 players, cell phones, e-book readers, IoT devices, servers, desktops, printers, televisions, streaming media devices, and the like. The computing device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the computing device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the computing device 300, a semiconductor-based microprocessor (in the form of a microchip or chipset), or generally any device for executing software instructions. When the computing device 300 is in operation, the processor 302 is configured to execute software stored within the memory 310, to communicate data to and from the memory 310, and to generally control operations of the computing device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the computing device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Computing Device Application for Traffic Forwarding and Monitoring

FIG. 5 is a network diagram of the cloud-based system 100 illustrating an application 350 on computing devices 300 with endpoints 102 configured to operate through the cloud-based system 100. Different types of computing devices 300 are proliferating, including Bring Your Own Device (BYOD) as well as IT-managed devices. The conventional approach for a computing device 300 to operate with the cloud-based system 100 as well as for accessing enterprise resources includes complex policies, VPNs, poor user experience, etc. The application 350 can automatically forward traffic with the cloud-based system 100 as well as ensuring that security and access policies are enforced, regardless of device, location, operating system, or application. The application 350 automatically determines if an endpoint 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless endpoint experience. This can be protocol as well as application-specific, and the application 350 can route traffic with a nearest or best fit node 150. Further, the application 350 can detect trusted networks, allowed applications, etc. and support secure network access. The application 350 can also support the enrollment of the computing device 300 prior to accessing applications. The application 350 can uniquely detect the endpoints 102 based on fingerprinting the computing device 300, using criteria like device model, platform, operating system, etc. The application 350 can support Mobile Device Management (MDM) functions, allowing IT personnel to deploy and manage the computing devices 300 seamlessly. This can also include the automatic installation of client and SSL certificates during enrollment. Finally, the application 350 provides visibility into device and app usage of the endpoint 102, for example, when a user utilizes the computing device 300.

The application 350 supports a secure, lightweight tunnel between the computing device 300 and the cloud-based system 100. For example, the lightweight tunnel can be HTTP-based. With the application 350, there is no requirement for PAC files, an IPsec VPN, authentication cookies, or endpoint 102 setup.

Cloud Integration Recommendations Based on Real-Time Traffic Monitoring

The present disclosure provides systems and methods for monitoring customer traffic in real-time to identify the usage of products and services. That is, the cloud-based system 100 is adapted to monitor endpoint traffic to determine what services and products customers of the cloud-based system 100 are using in order to provide verified third party service integration recommendations. The various integration recommendations can be provided to users via an administrative portal including a marketplace for selecting integrations to enable.

Application marketplaces, integration marketplaces, etc. are saturated with large amounts of available options. The more entries that get added to these marketplaces makes it more and more difficult to find relevant and useful options.

In terms of cloud environment administrative efforts, being able to quickly identify what is applicable provides a more tailored admin experience. By utilizing the present systems and methods, the present systems can provide verified recommendations to administrators of cloud customers. These recommendations are based on real-time traffic inspection and user data provided by agent applications 350 installed on customer devices which provide valuable insight as to what services customers are using.

In the present disclosure, the various examples are described in relevance to cloud integrations with various third party services. That is, the recommendations described herein include integration options between the services of the cloud-based system 100 and one or more third party services/products. It will be appreciated that the present real-time traffic monitoring for determining and providing recommendations can be implemented for other platforms such as an application marketplace or the like. More particularly, the present systems perform analysis to recommend software integrations that can be used or activated in a customer environment for improving effectiveness or efficiency. The recommendations can be any of integration recommendations, application recommendations, cloud resource recommendations, third party API integrations, etc, wherein these recommendations can be referred to as software recommendations. Further, the monitoring as described herein can be inline between endpoints and destinations. That is, the systems can monitor real-time traffic originating from users, IoT devices, resources, etc.

Figure 6:
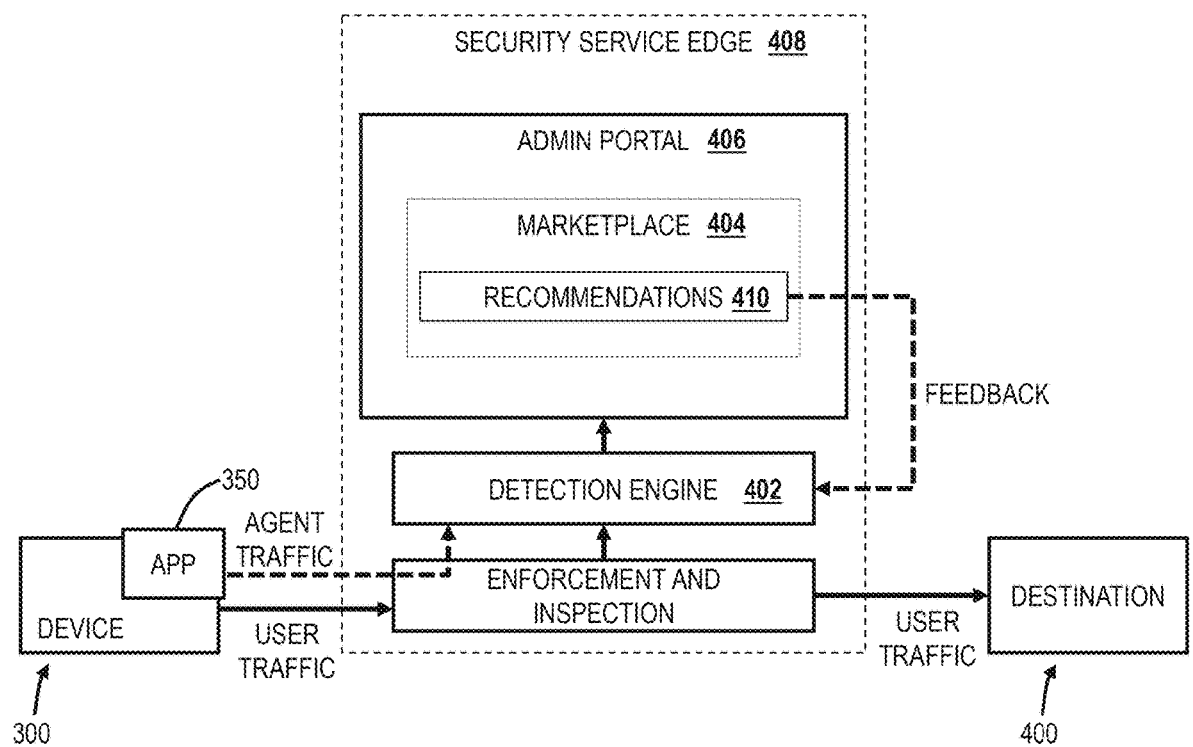
FIG. 6 is a flow diagram of an embodiment for providing cloud integration recommendations based on real-time traffic monitoring.

FIG. 6 is a flow diagram of an embodiment for providing cloud integration recommendations based on real-time traffic monitoring. The security service edge (SSE) 408 shown in FIG. 6 can be contemplated as a hub for the various security services provided by the cloud-based system 100. Again, these security services can include Secure Web Gateways (SWG), Zero Trust Network Access (ZTNA), Cloud Access Security Brokers (CASB), Firewall-as-a-Service (FWaaS), and any other access control service described herein.

As endpoint traffic traverses the enforcement and inspection provided by the various security products of the cloud-based system 100 described herein, metadata from the user traffic is extracted. This metadata can include, but is not limited to, destination Internet Protocol (IP) address, Fully Qualified Domain Name (FQDN), Uniform Resource Locator (URL), Server Name Indication (SNI), Internet Protocol Security (IPsec), Internet Key Exchange (IKE) vendor name, etc. In various embodiments, this metadata can be further enriched by the connector application 350 executing on computing devices 300. That is, the application 350 can provide additional information relating to the user traffic for detection engine 402 processing. This additional information can include, but is not limited to, agents installed on computing devices of the customer, applications installed on the computing devices of the customer, and the like. That is, the application 350 can be adapted to inventory the list of other agents/applications installed on the computing device 300.

In various embodiments, the application 350 can collect such additional information by communicating with an Operating System (OS) of a computing device 300 on which it is installed, and/or communicating with other agents on the computing device 300. Such information can be retrieved via agent-to-agent communications, either directly (via a socket) or via one leaving a file on the file system and the other reading it. Additionally, this can be facilitated by reading/writing data to a Windows registry or Linux kernel parameters for another agent to read/write.

After extraction of metadata from the live traffic, the user metadata is forwarded to a detection engine 402, where it is cross-referenced with established destinations associated with third party products/solutions from service providers which have integrations with the cloud-based system 100. That is, the systems can persist an inventory of integrations which is correlated to the metadata to produce the recommendations described herein. In the present disclosure, the term service provider can refer to any provider of software, applications, and services which can be integrated with the services offered through the cloud-based system 100. The additional information provided by the application 350 can be utilized to increase the confidence of the findings. The systems can then determine one or more recommendations 410, the recommendations 410 being any integrations of the cloud-based system to any of the products/solutions determined to be used by the customer. Subsequently, when an administrator of a customer of the cloud-base system 100, to which the user providing the user traffic is associated with, accesses the administration portal 406 and visits the marketplace 404, the administrator can easily identify and emphasize any relevant integrations based on the provided recommendations 410.

In addition to determining and providing integration recommendations to customers of the cloud-based system 100, the present mechanisms can be utilized to determine whether third party integrations should be added to the cloud-based system 100 itself. More particularly, the present systems can determine, based on the monitoring, whether an API integration should be established with a third party service provider. Thus, based on the monitoring, the present systems can provide recommendations to customers to integrate their third party services with the cloud-based system 100 via an API.

The present real-time traffic-based integration recommendations can be achieved due to the ability of the cloud-based system 100 to monitor real-time endpoint traffic inline. That is, the present systems, including the various security solutions provided by the cloud-based system 100 sit between endpoints 102 and destinations 400. Because of this, the present systems can observe customer traffic to detect usage of third party products/services (destinations 400) to provide accurate integration recommendations to administrators.

In an example, a customer of the cloud-based system is contemplated as having 10,000 employees disbursed around the world. In an example use case, among the 10,000 employees, if the systems notice a small number of IT administrators beginning to use a service by detecting the administrators logging into the services admin portal, or an agent associated with the service being present on their devices, the systems can contemplate this as signifying the customer evaluating the service. In response, the present systems can recommend an integration that is available in the marketplace 404 to administrators of the customer. Further, the systems can also provide marketing efforts to the administrators, i.e., sending IT administrators links to demo videos, documentation, deployment guides, customer deployment and configuration material, and the like in association with the available integration.

In a similar use case, among the 10,000 employees of the customer, if the present systems detect a significant portion of the employees using a service, i.e., by detecting the services agent on the employee's devices and/or detecting the service in real-time traffic, the present systems can assume that the customer is also a customer of the service.

Based on this, the present systems can promote (make a recommendation for) the services integration with the cloud-based system. Again, the marketing efforts can be implemented based thereon.

Again, in addition to fingerprinting and inspecting live traffic between users and destinations, being able to leverage the application 350 installed on customer devices to detect when any technology partners components/processes are installed provides another source of data for the detection engine 402.

In another use case, the present systems can extract Hypertext Transfer Protocol (HTTP) metadata via the application 350 from transient Application Programming Interface (API) calls from clients to detect client usage. This detected usage can then be utilized to provide the recommendations 410.

In another use case, customers can configure one or more of the security services provided by the cloud-based system 100 to probe endpoints of Software-as-a-Service (SaaS) services with which the cloud-based system 100 has integrations with. The information gathered from these probes can then be utilized to inform the detection engine 402 to make recommendations 410.

In various embodiments, the detection engine 402 can be configured to receive reinforcement learning from human feedback input from administrators. This can be implemented in response to a low or medium confidence of an integration recommendation 410. In various embodiments, the confidence of a recommendation can be correlated to whether the recommendation is acted upon by administrators. That is, a recommendation can begin with a high confidence, and as time passes, the confidence can decrease if not acted upon. The present systems can detect low usage based on the ability to observe how particular services function. Further, reinforcement learning can be implemented responsive to the systems presenting a recommendation 410 that is incorrect. The systems can identify an incorrect recommendation based on presenting administrators with an option to provide feedback. For example, an option can allow administrators to provide feedback such as asking, "are you a customer of product X?". These options can be presented along with each recommendation 410 in the marketplace 404. The recommendations provided by the present systems can then be altered based on the feedback. For example, the systems can remove a recommendation from the marketplace if a response to the option for feedback of "are you a customer of product X?" is "No". Therefore, the recommendation for the integration of product X will be removed, and/or the confidence with be lowered.

Such a feedback loop can be a continuous and ongoing evolution based on human feedback as well as observations by the system over a time window. That is, the recommendations and associated confidence of each can be continuously altered based on the inline monitoring of the present system as well as the feedback received from users.

Additionally, the order in which the recommendations are presented within the marketplace 404 can be based on the associated confidence of each recommendation. That is, recommendations with higher confidence are displayed above those with lower confidence. In various embodiments, the recommendations 410 provided to activate the various relevant integrations can be simplified via customer deployment and configuration material such as deployment guides, demonstrations, etc.

As described herein, the cloud-based system 100 can service a plurality of customers, each having a plurality of users. For example, a customer can be an enterprise having employees. In various embodiments, the present systems adapted to provide the software recommendations can be adapted to perform the present processes on a per-customer basis. That is, the extracting of metadata, the determining one or more recommendations, and the presenting of the recommendations via the administrative portal can all be performed on a per-customer bases, thereby providing tailored recommendations based on each of the customers characteristics and traffic.

Figure 7:
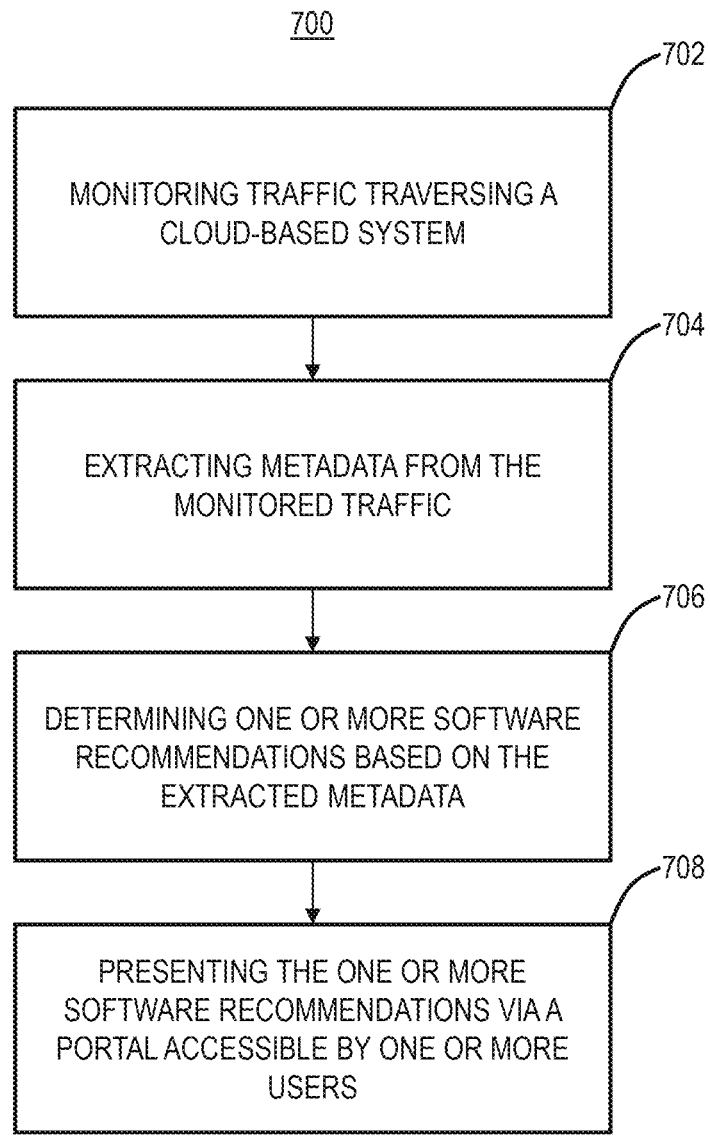
FIG. 7 is a flow chart of a process for providing integration recommendations based on real-time traffic monitoring.

Process for Providing Integration Recommendations Based on Real-Time Traffic Monitoring FIG. 7 is a flow chart of a process 700 for providing integration recommendations based on real-time traffic monitoring. The process 700 includes monitoring traffic traversing a cloud-based system, the traffic originating from one or more endpoints associated with a customer of the cloud-based system (step 702); extracting metadata from the monitored traffic (step 704); determining one or more software recommendations based on the extracted metadata (step 706); and presenting the one or more software recommendations via a portal accessible by one or more users (step 708).

The process 700 can further include monitoring real-time traffic via the cloud-based system, and wherein the traffic is monitored between one or more endpoints and one or more destinations. The metadata can include any of destination Internet Protocol (IP) address, Fully Qualified Domain Name (FQDN), Uniform Resource Locator (URL), Server Name Indication (SNI), Internet Protocol Security (IPsec), and Internet Key Exchange (IKE) vendor name. The steps can further include receiving additional information associated with the traffic from a connector application executing on one or more computing devices associated with the one or more endpoints. The additional information can include any of agents installed on the one or more computing devices and applications installed on the one or more computing devices. The customer of the cloud-based system can be one of a plurality of customers, wherein the extracting, determining, and presenting are performed on a per-customer basis. The one or more software recommendations can include integration recommendations, wherein the determining further includes cross-referencing the extracted metadata with destinations associated with third party products from service providers which have integrations with the cloud-based system. The steps can further include receiving feedback associated with the one or more software recommendations; and altering the one or more software recommendations based thereon. The altering can include any of removing a software recommendation of the one or more software recommendations and reducing a confidence of a software recommendation of the one or more software recommendations. The presenting can further include providing customer deployment and configuration material such as any of deployment guides, and demonstrations associated with each of the one or more software recommendations.

Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:
   monitoring traffic traversing a cloud-based system, the traffic originating from one or more endpoints associated with a customer of the cloud-based system;
   extracting metadata from the monitored traffic;
   determining one or more software recommendations based on the extracted metadata; and
   presenting the one or more software recommendations via a portal accessible by one or more users.

2. The method of claim 1, wherein the monitoring includes monitoring real-time traffic via the cloud-based system, and wherein the traffic is monitored between one or more endpoints and one or more destinations.

3. The method of claim 1, wherein the metadata includes any of destination Internet Protocol (IP) address, Fully Qualified Domain Name (FQDN), Domain Name System (DNS) text records, Uniform Resource Locator (URL), Server Name Indication (SNI), Internet Protocol Security (IPsec), and Internet Key Exchange (IKE) vendor name.

4. The method of claim 1, wherein the steps further comprise:
   receiving additional information associated with the traffic from a connector application executing on one or more computing devices associated with the one or more endpoints.

5. The method of claim 4, wherein the additional information includes any of agents installed on the one or more computing devices and applications installed on the one or more computing devices.

6. The method of claim 1, wherein the customer of the cloud-based system is one of a plurality of customers, and wherein the extracting, determining, and presenting are performed on a per-customer basis.

7. The method of claim 1, wherein the one or more software recommendations include integration recommendations, and wherein the determining further comprises:
   cross-referencing the extracted metadata with destinations associated with third party products from service providers which have integrations with the cloud-based system.

8. The method of claim 1, wherein the steps further comprise:
   receiving feedback associated with the one or more software recommendations; and
   altering the one or more software recommendations based thereon.

9. The method of claim 8, wherein the altering includes any of removing a software recommendation of the one or more software recommendations and reducing a confidence of a software recommendation of the one or more software recommendations.

10. The method of claim 1, wherein the presenting further includes providing any of customer deployment and configuration material, and demonstrations associated with each of the one or more software recommendations.

11. A non-transitory computer-readable medium comprising instructions that, when executed, cause one or more processors to perform steps of:
    monitoring traffic traversing a cloud-based system, the traffic originating from one or more endpoints associated with a customer of the cloud-based system;
    extracting metadata from the monitored traffic;
    determining one or more software recommendations based on the extracted metadata; and
    presenting the one or more software recommendations via a portal accessible by one or more users.

12. The non-transitory computer-readable medium of claim 11, wherein the monitoring includes monitoring real-time traffic via the cloud-based system, and wherein the traffic is monitored between one or more endpoints and one or more destinations.

13. The non-transitory computer-readable medium of claim 11, wherein the metadata includes any of destination Internet Protocol (IP) address, Fully Qualified Domain Name (FQDN), Domain Name System (DNS) text records, Uniform Resource Locator (URL), Server Name Indication (SNI), Internet Protocol Security (IPsec), and Internet Key Exchange (IKE) vendor name.

14. The non-transitory computer-readable medium of claim 11, wherein the steps further comprise:

receiving additional information associated with the traffic from a connector application executing on one or more computing devices associated with the one or more endpoints.

15. The non-transitory computer-readable medium of claim 14, wherein the additional information includes any of agents installed on the one or more computing devices and applications installed on the one or more computing devices.

16. The non-transitory computer-readable medium of claim 11, wherein the customer of the cloud-based system is one of a plurality of customers, and wherein the extracting, determining, and presenting are performed on a per-customer basis.

17. The non-transitory computer-readable medium of claim 11, wherein the one or more software recommendations include integration recommendations, and wherein the determining further comprises:
   cross-referencing the extracted metadata with destinations associated with third party products from service providers which have integrations with the cloud-based system.

18. The non-transitory computer-readable medium of claim 11, wherein the steps further comprise:
   receiving feedback associated with the one or more software recommendations; and
   altering the one or more software recommendations based thereon.

19. The non-transitory computer-readable medium of claim 18, wherein the altering includes any of removing a software recommendation of the one or more software recommendations and reducing a confidence of a software recommendation of the one or more software recommendations.

20. The non-transitory computer-readable medium of claim 11, wherein the presenting further includes providing any of customer deployment and configuration material, and demonstrations associated with each of the one or more software recommendations.

\* \* \* \* \*